(12) United States Patent
Yoshino et al.

(10) Patent No.: US 8,768,601 B2
(45) Date of Patent: Jul. 1, 2014

(54) CONTROL DEVICE FOR INTERNAL COMBUSTION ENGINE HAVING VARIABLE VALVE MECHANISM

(75) Inventors: Takahiro Yoshino, Yokosuka (JP); Masahiro Arai, Yokohama (JP); Yuzo Kageyama, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 828 days.

(21) Appl. No.: 13/001,926

(22) PCT Filed: Jun. 9, 2009

(86) PCT No.: PCT/JP2009/060814
§ 371 (c)(1),
(2), (4) Date: Dec. 29, 2010

(87) PCT Pub. No.: WO2010/001711
PCT Pub. Date: Jan. 7, 2010

(65) Prior Publication Data
US 2011/0106410 A1 May 5, 2011

(30) Foreign Application Priority Data
Jun. 30, 2008 (JP) .................. 2008-170112

(51) Int. Cl.
*F01L 1/34* (2006.01)
*F02D 13/02* (2006.01)
*F02D 41/00* (2006.01)

(52) U.S. Cl.
CPC ...... *F02D 13/0226* (2013.01); *F02D 2041/001* (2013.01); *F02D 2250/28* (2013.01)
USPC ....................... 701/103; 123/90.15; 123/90.22

(58) Field of Classification Search
CPC ................. F01L 1/34; F01L 1/02; F01L 1/18; F02M 25/07; F02D 13/0226; F02D 41/04; F02D 41/0002; F02D 2041/001; F02D 2200/1015; F02D 2250/28; F02D 2041/002; Y02T 10/42; Y02T 10/18
USPC ........ 123/90.11, 90.15–90.18, 321, 322, 324, 123/345, 346, 347, 348, 90.31, 361, 403; 701/101–105, 110, 114, 115; 74/568 R; 73/114.37, 114.02, 114.16
See application file for complete search history.

(56) References Cited

U.S. PATENT DOCUMENTS 6,390,041 B2 * 5/2002 Nakamura et al. ......... 123/90.15
6,513,467 B2 * 2/2003 Nohara et al. ............. 123/90.15

(Continued)

FOREIGN PATENT DOCUMENTS

CN 1550652 A 12/2004
CN 101105146 A 1/2008

(Continued)

*Primary Examiner* — Hai Huynh
*Assistant Examiner* — Raza Najmuddin
(74) *Attorney, Agent, or Firm* — Foley & Lardner LLP

(57) ABSTRACT

In a control device for an internal combustion engine includes an intake valve, a variable valve mechanism capable of controlling a closing timing and an operating angle of the intake valve continuously and variably, a detection unit for detecting a possibility of pre-ignition, and a throttle for controlling an intake air amount such that when the possibility of pre-ignition is detected, the intake valve closing timing is retarded from bottom dead center by increasing the intake valve operating angle, the control device includes, an operating angle upper limit limiting value calculation unit that calculates an operating angle upper limit limiting value for limiting an upper limit value of the intake valve operating angle, and a throttle opening upper limit limiting value calculation unit that calculates a throttle opening upper limit limiting value for limiting an upper limit value of a throttle opening on the basis of the intake valve operating angle.

17 Claims, 8 Drawing Sheets

(56) References Cited

U.S. PATENT DOCUMENTS

| | | | |
|---|---|---|---|
| 6,557,540 B1* | 5/2003 | Mianzo et al. | 123/678 |
| 6,769,404 B2* | 8/2004 | Aoyama et al. | 123/406.29 |
| 6,820,579 B2* | 11/2004 | Kawamura et al. | 123/90.16 |
| 6,877,493 B2* | 4/2005 | Kawamura et al. | 123/568.14 |
| 6,910,461 B2 | 6/2005 | Tanei et al. | |
| 6,971,350 B2* | 12/2005 | Akasaka et al. | 123/90.16 |
| 7,806,105 B2 | 10/2010 | Fuwa et al. | |
| 8,265,857 B2* | 9/2012 | Murai et al. | 701/105 |
| 8,473,182 B2* | 6/2013 | Suzuki et al. | 701/103 |
| 2002/0092488 A1* | 7/2002 | Aoyama et al. | 123/90.16 |
| 2002/0129780 A1* | 9/2002 | Nohara et al. | 123/90.16 |
| 2004/0055571 A1* | 3/2004 | Hashizume et al. | 123/406.29 |
| 2005/0188931 A1* | 9/2005 | Akasaka et al. | 123/90.16 |
| 2006/0090728 A1 | 5/2006 | Arinaga et al. | |
| 2008/0011253 A1* | 1/2008 | Nakamura | 123/90.15 |
| 2009/0217906 A1* | 9/2009 | Nishimoto et al. | 123/348 |
| 2011/0106410 A1* | 5/2011 | Yoshino et al. | 701/103 |
| 2012/0290193 A1* | 11/2012 | Suzuki et al. | 701/103 |

FOREIGN PATENT DOCUMENTS

| | | |
|---|---|---|
| CN | 101155974 A | 4/2008 |
| JP | 2001-159328 A | 6/2001 |
| JP | 2001-159348 A | 6/2001 |
| JP | 2001-182563 A | 7/2001 |
| JP | 2002-89303 A | 3/2002 |
| JP | 2002-89341 A | 3/2002 |
| JP | 2002-129994 A | 5/2002 |
| JP | 2007-278083 A | 10/2007 |
| JP | 2007-298047 A | 11/2007 |
| JP | 2008-19756 A | 1/2008 |
| JP | 2008-038796 A | 2/2008 |
| JP | 2008-95503 A | 4/2008 |

* cited by examiner

ND VARIABLE
CONTROL DEVICE FOR INTERNAL COMBUSTION ENGINE HAVING VARIABLE VALVE MECHANISM

TECHNICAL FIELD

This invention relates to intake control performed on an internal combustion engine having a variable valve mechanism that is capable of controlling an operating angle of an intake valve variably.

BACKGROUND ART

To improve an output performance and suppress fuel consumption in an internal combustion engine, a valve timing of an intake valve is conventionally controlled variably using a variable valve mechanism. If an internal combustion engine having this type of variable valve mechanism is operated at a valve timing for increasing an actual compression ratio, so-called pre-ignition may occur when a cooling water temperature and an intake air temperature are high.

JP2002-129994A, published by the Japan Patent Office in 2002, proposes a technique for preventing this pre-ignition by limiting a throttle opening or the like to reduce an intake air amount of an engine under operating conditions in which pre-ignition is predicted to occur.

DISCLOSURE OF THE INVENTION

However, when the intake air amount is limited in accordance with this prior art, a reduction in an output torque of the engine is unavoidable. On the other hand, the valve timing may be modified to reduce the actual compression ratio, but when the valve timing is modified, vibration or noise may occur in a vehicle.

It is therefore an object of this invention to provide a control device for an internal combustion engine having a variable valve mechanism with which pre-ignition can be prevented and increases in vibration and noise in a vehicle can be suppressed.

To achieve this object, this invention provides a control device for an internal combustion engine comprising an intake valve, a variable valve mechanism capable of controlling a closing timing and an operating angle of an intake valve continuously and variably, means for detecting a possibility of pre-ignition, and a throttle for controlling an intake air amount such that when the possibility of pre-ignition is detected, the intake valve closing timing is retarded from bottom dead center by increasing the intake valve operating angle, the control device further comprising an operating angle upper limit limiting value calculating means for calculating an operating angle upper limit limiting value to limit an upper limit value of the intake valve operating angle in accordance with a noise/vibration requirement determined from operating conditions, and a throttle opening upper limit limiting value calculating means for calculating a throttle opening upper limit limiting value to limit an upper limit value of a throttle opening on the basis of the intake valve operating angle.

Details of this invention as well as other features and advantages thereof are set forth in the following description of the specification and illustrated in the attached figures.

BEST MODES FOR CARRYING OUT THE INVENTION

Figure 1:
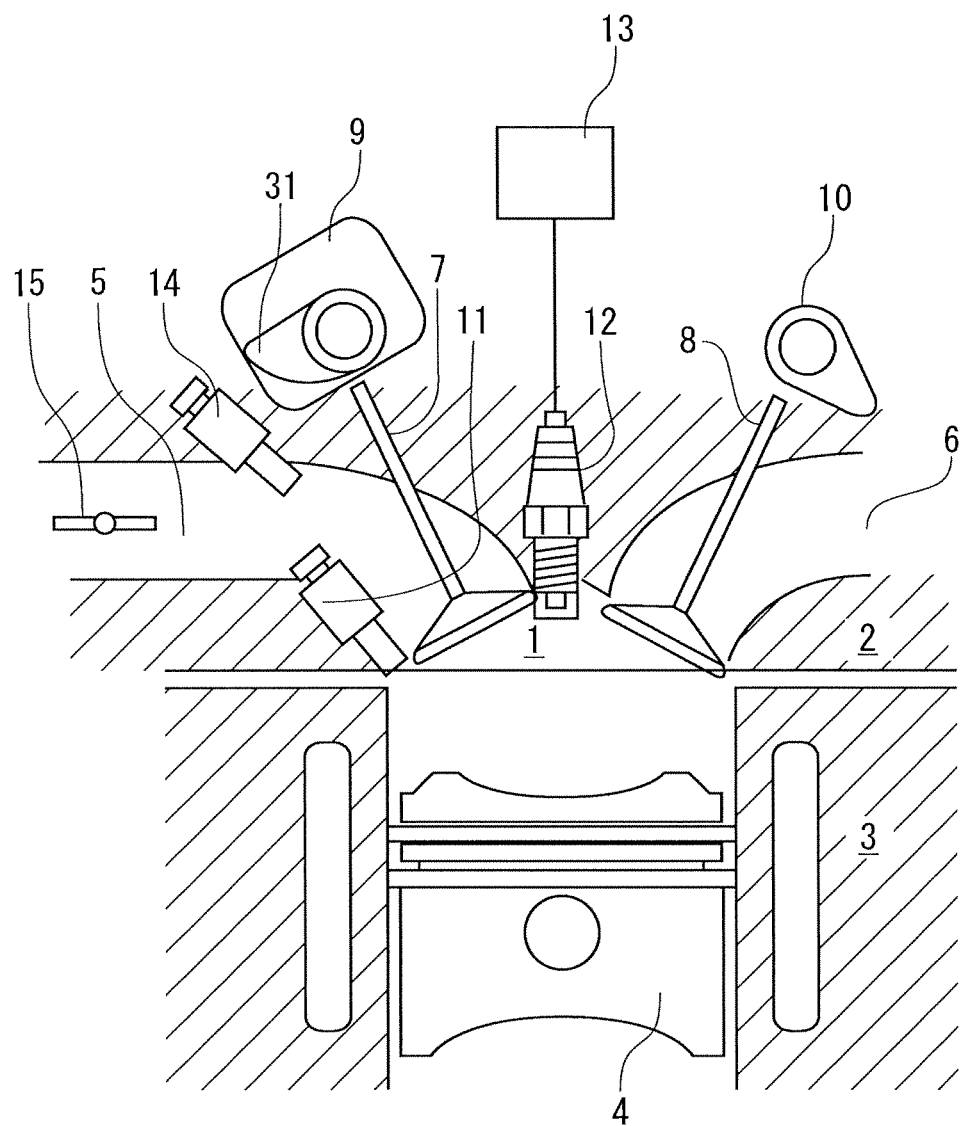
FIG. 1 is a schematic diagram showing the constitution of an internal combustion engine to which this invention is applied.

Referring to FIG. 1 of the drawings, an internal combustion engine for a vehicle, which is controlled by a controller 13 according to this invention, includes a combustion chamber 1, an intake passage 5, and an exhaust passage 6 that open respectively onto a combustion chamber 1. An intake valve 7 and an exhaust valve 8 are provided in an opening portion of the intake passage 5 and an opening portion of the exhaust passage 6, respectively. The intake valve 7 is driven via a variable valve mechanism 9. The exhaust valve 8 is driven by an exhaust cam shaft 10.

Two intake valves 7 and two exhaust valves 8 are provided in each cylinder of the internal combustion engine. Accordingly, two intake passages 5 and two exhaust passages 6 are provided in each cylinder. The two intake passages 5 are formed as two branches of a single passage that is in the interior of a cylinder head 2 and has an opening portion that opens onto one side face of the cylinder head 2. The two exhaust passages 6 converge in the interior of the cylinder head 2 to form a single passage having an opening portion that opens onto another side face of the cylinder head 2.

A first fuel injection valve 11 injects fuel directly into the combustion chamber 1 from a side face of the combustion chamber 1.

A spark plug 12 is provided near the center of a ceiling surface of the combustion chamber 1.

A throttle valve 15 is provided in the intake passage 5 prior to bifurcation. The throttle 15 is basically maintained in a fully open position. An intake air amount of the internal combustion engine is adjusted by controlling a valve timing, a lift, and an operating angle of the intake valve 7. It should be noted, however, that when negative pressure is required for a brake master back or the like, an opening of the throttle valve 15 is reduced in order to generate negative pressure in the intake passage 5. Cases in which negative pressure is required may be handled by providing a negative pressure generating pump instead of providing a throttle valve 15.

Further, the exhaust cam shaft 10 is a typical rotary cam shaft. The variable valve mechanism 9 controls the lift and operating angle of the intake valve 7 variably by means of the following constitution.

It should be noted that here, the lift of the intake valve 7 indicates a maximum lift of the intake valve 7. Further, variable control of the lift indicates variable control of the maximum lift rather than lift variation during an open/close cycle of the intake valve 7.

Furthermore, in this embodiment, the variable valve mechanism is provided only on the intake valve 7 side, but a similar variable valve mechanism may be provided on the exhaust valve side such that an open/close timing of the exhaust valve is controlled in accordance with operating conditions.

The variable valve mechanism 9 is formed from a combination of a lift and operating angle variable mechanism 20 that varies the lift and operating angle of the intake valve 7, and a phase variable mechanism 21 that advances or retards a center position of the lift.

It should be noted that both the lift and operating angle variable mechanism 20 and the phase variable mechanism 21 are known from JP200289303A and JP200289341A, published by the Japan Patent Office in 2002.

The lift and operating angle variable mechanism 20 includes a hollow drive shaft 22 supported to be free to rotate on a cam bracket that is provided in an upper portion of the cylinder head 2 in FIG. 1, an eccentric cam 23 fixed to the drive shaft 22 by press-fitting or the like, a control shaft 24 supported to be free to rotate by the same cam bracket above the drive shaft 22 and disposed parallel to the drive shaft 22, a rocker arm 28 supported to be free to rock on an eccentric cam portion 25 of the control shaft 24, and a rocker cam 31 that contacts a tappet 42 disposed on an upper end portion of each intake valve 7. The rocker arm 28 is connected to a link arm 26 in the vicinity of one end portion thereof via a connecting pin 27 and connected to an upper side end portion of a link member 30 in the vicinity of another end portion thereof via a connecting pin 29. A lower side end portion of the link member 30 is connected to the rocker cam 31 via a connecting pin 45.

The drive shaft 22 is driven by the eccentric cam 23 of the engine via a timing chain or a timing belt.

The eccentric cam 23 has a circular outer peripheral surface, a center of the outer peripheral surface being offset from an axial center of the drive shaft 22 by a predetermined amount, and a ring-shaped portion 26a of the link arm 26 is fitted rotatably to the outer peripheral surface.

The eccentric cam portion 25 penetrates a substantially central portion of the rocker arm 28 rotatably. The eccentric cam portion 25 is offset from an axial center of the control shaft 24 such that a rocking center of the rocker arm 28 varies in accordance with an angular position of the control shaft 24.

The rocker cam 31 is fitted to an outer periphery of the drive shaft 22 and supported thereon to be free to rotate. A lower end portion of the link member 30 is connected via the connecting pin 45 to an end portion 31a of the rocker cam 31 that extends in a right-angle direction relative to an axial direction of the drive shaft 22. A base circle surface 31c forming a concentric arc with the drive shaft 22 and a cam surface 31b extending in the form of a curve from the base circle surface 31c to the aforementioned end portion are formed continuously on a lower surface of the rocker cam 31. The base circle surface 31c and cam surface 31b contact an upper surface of the tappet 42 depending on a rocking position of the rocker cam 31.

In other words, the base circle surface 31c is a section in which the lift of the intake valve 7 is zero as a base circle section, and when the rocker cam 31 rocks such that the cam surface 31b contacts the tappet 42, the intake valve 7 gradually lifts. It should be noted that a small ramp section is provided between the base circle section and a lift section.

The control shaft 24 is constituted to rotate within a predetermined angular range by a lift and operating angle control hydraulic actuator 44 provided on one end portion thereof. An oil pressure supply to the lift and operating angle control hydraulic actuator 44 is controlled by a control signal from the controller 13.

When the drive shaft 22 of the lift and operating angle variable mechanism 20 rotates, the link arm 26 is moved vertically by a cam action of the eccentric cam 23, whereby the rocker arm 28 rocks using the control shaft 24 as a rocking shaft. The rocking motion of the rocker arm 28 is transmitted to the rocker cam 31 via the link member 30, causing the rocker cam 31 to rock. The tappet 42 is pressed by the cam action of the rocker cam 31, and therefore the intake valve 7 lifts. When the lift and operating angle control hydraulic actuator 44 varies a rotation angle of the control shaft 24, a rocking center position of the rocker arm 28 varies, leading to variation in an initial rocking position of the rocker cam 31.

For example, when the eccentric cam portion 25 is positioned upward, the entire rocker arm 28 is positioned upward and the end portion 31a of the rocker cam 31 is pulled relatively upward. In other words, the initial rocking position of the rocker cam 31 is set such that the cam surface 31b is tilted in a direction heading away from the tappet 42. Hence, when the rocker cam 31 rocks as the drive shaft 22 rotates, the base circle surface 31c continues to contact the tappet 42 for a long time, whereas the period of contact between the cam surface 31b and the tappet 42 is short. Therefore, the overall lift amount decreases, and an angular range from an opening timing to a closing timing, or in other words the operating angle of the cam, is reduced.

Conversely, when the eccentric cam portion 25 is positioned downward, the entire rocker arm 28 is positioned downward and the end portion 31a of the rocker cam 31 is pushed relatively downward. In other words, the initial rocking position of the rocker cam 31 is set such that the cam surface 31b is tilted in a direction approaching the tappet 42. Hence, when the rocker cam 31 rocks as the drive shaft 22 rotates, the contact site with the tappet 42 shifts immediately from the base circle surface 31c to the cam surface 31b. Therefore, the overall lift amount increases, and the operating angle is enlarged.

The initial position of the eccentric cam portion 25 can be varied continuously, and therefore a valve lift characteristic varies continuously in accordance therewith.

In other words, the lift and operating angle variable mechanism 20 can enlarge and reduce the lift and the operating angle simultaneously and continuously.

The phase variable mechanism 21 is constituted by a sprocket 46 provided on a front end portion of the drive shaft 22, and a phase control actuator 43 that causes the sprocket 46 and the drive shaft 22 to rotate relative to each other within a predetermined angular range. The sprocket 46 rotates in synchronization with a crankshaft via a timing chain or a timing belt. The phase control actuator 43 is controlled by a control signal from the controller 13. In accordance with an operation of the phase control actuator 43, the sprocket 46 and the drive shaft 22 rotate relative to each other, whereby a lift central angle is advanced or retarded. In other words, according to the phase variable mechanism 21, a curve of the lift characteristic is advanced or retarded in its entirety without altering the form thereof. This variation can also be performed continuously. Various types of actuators, such as a hydraulic actuator or an electromagnetic actuator, may be used as the phase control actuator 43.

As described above, with the variable valve mechanism 9, the lift and the operating angle of the intake valve 7 can be enlarged or reduced simultaneously and continuously, and the overall lift characteristic can be advanced or retarded continuously in its entirety without altering the form thereof. In other words, an opening timing and a closing timing of the intake valve 7 can be controlled independently.

In this embodiment, the valve timing of the intake valve 7 is set in the following manner.

Figure 3B:
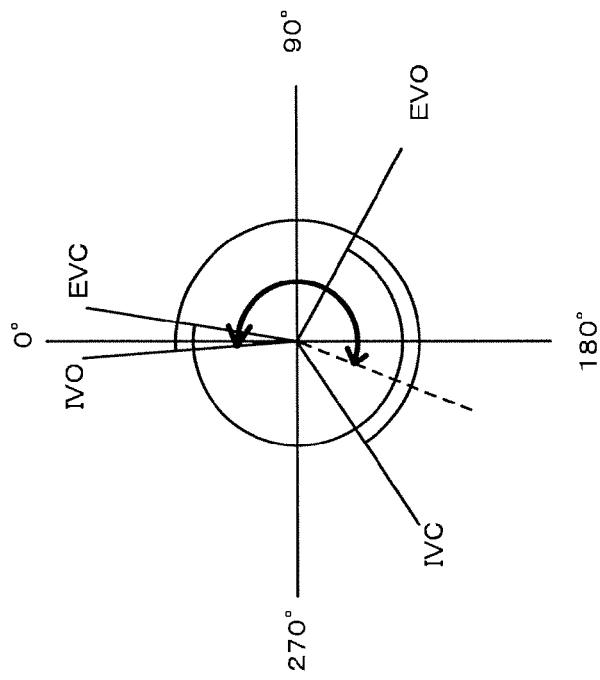
FIG. 3B is view showing examples of valve timings.
Figure 3A:
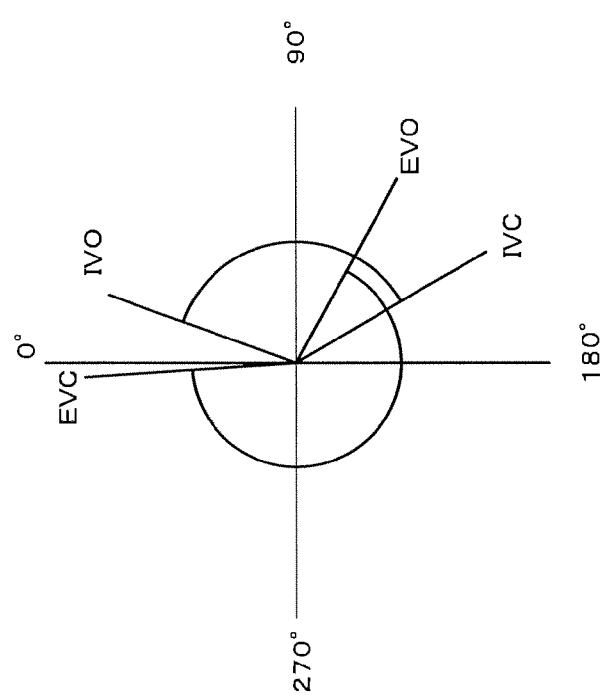
FIG. 3A is view showing examples of valve timings.

FIG. 3A shows an example of a valve timing for a normal idle operation (an idle operation in which the danger of pre-ignition does not exist), while FIG. 3B shows an example of a valve timing for preventing pre-ignition.

In a case where the need to suppress fuel consumption is large, for example during an idle operation, an intake valve closing timing IVC is set at before bottom dead center by reducing the operating angle, as shown in FIG. 3A, in order to reduce pumping loss.

When, in this state, an in-cylinder temperature increases due to an increase in a cooling water temperature or an intake air temperature or the like, pre-ignition is more likely to occur.

Pre-ignition can be prevented effectively by increasing the operating angle such that the intake valve closing timing IVC is set on a retardation side of bottom dead center and a piston position at the intake valve closing timing IVC is higher than the piston position during a normal idle operation, as shown in FIG. 3B. The reason for this is that by raising the piston position when the valve closes, the intake air amount and an actual compression ratio can be reduced.

However, if the operating angle is increased as shown in FIG. 3B, a reaction force that acts on the rocker cam 31 when the intake valve 7 is driven increases. As a result, sliding portions between the respective links 26, 28, 30 of the variable valve mechanism 9, for example a sliding surface between the outer peripheral surface of the eccentric cam 23 and an inner peripheral surface of the link arm 26, are subjected to increased surface pressure, leading to increased noise and vibration. When an engine rotation speed is low, for example during an idle operation, this increase in surface pressure is particularly large, and therefore a vehicle driver is subjected to loud noise and strong vibration.

To suppress the noise and vibration to an allowable amount, the operating angle of the intake valve 7 must be reduced below the operating angle for preventing pre-ignition, as shown by an arrow in FIG. 3B, for example.

At this valve timing, however, the closing timing of the intake valve 7 approaches bottom dead center, and therefore the actual compression ratio increases beyond the pre-ignition prevention valve timing. Hence, pre-ignition cannot be prevented at this valve timing.

Therefore, to prevent pre-ignition, the intake air amount must be reduced even further by reducing the opening of the throttle 15.

The controller 13 controls the valve timing of the intake valve 7 and the opening of the throttle 15.

The controller 13 is constituted by a microcomputer including a central processing unit (CPU), a read-only memory (ROM), a random access memory (RAM), and an input/output interface (I/O interface). The controller 13 may be constituted by a plurality of microcomputers.

Figure 4:
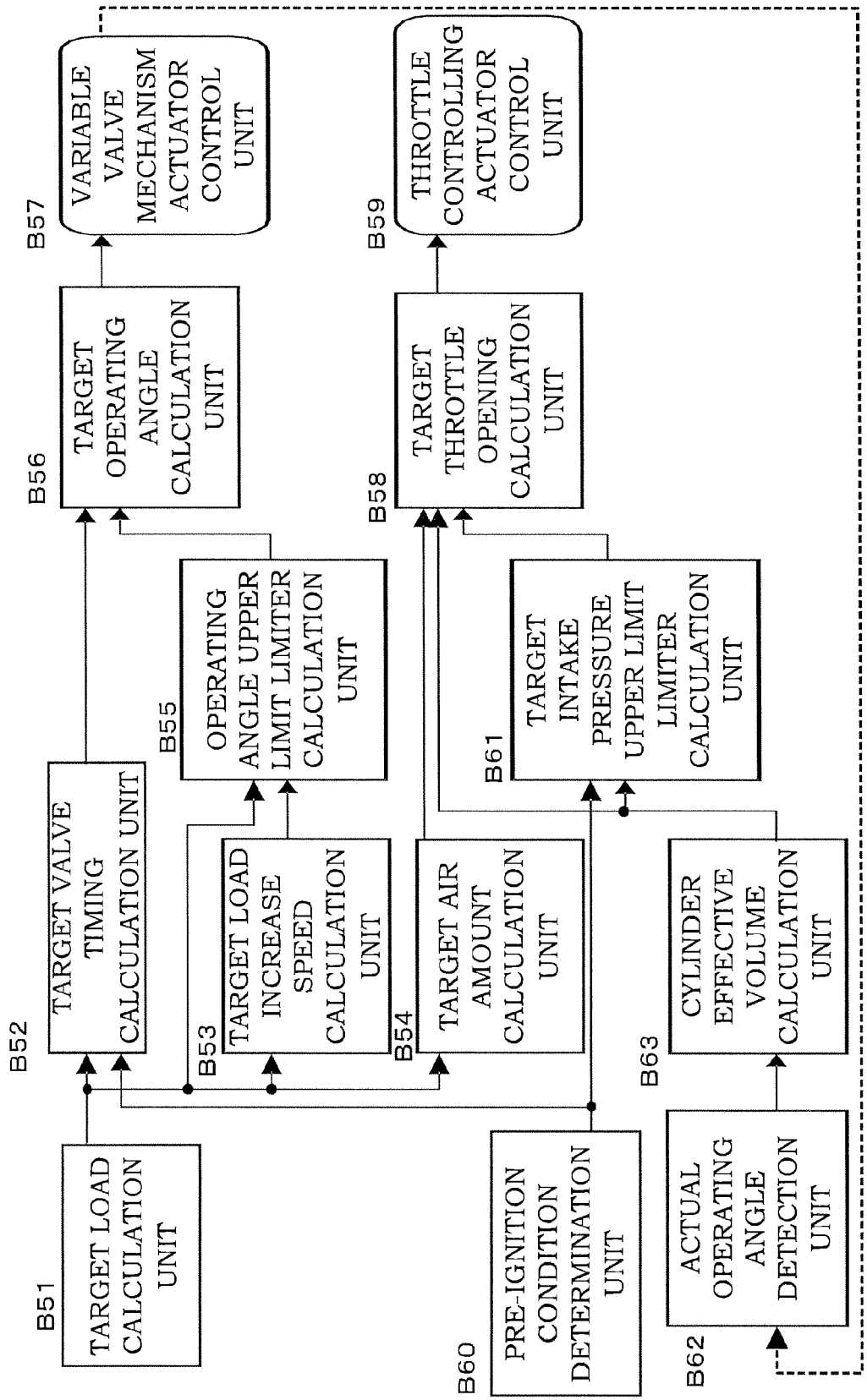
FIG. 4 is a block diagram showing valve timing control and throttle valve opening control according to this invention.

FIG. 4 is a block diagram illustrating valve timing control and throttle control executed by the controller 13. The controller 13 executes this control repeatedly at fixed periods (ten milliseconds, for example). It should be noted that respective blocks shown in the figure represent functions of the controller 13 in the form of virtual units that do not exist physically.

Figure 2:
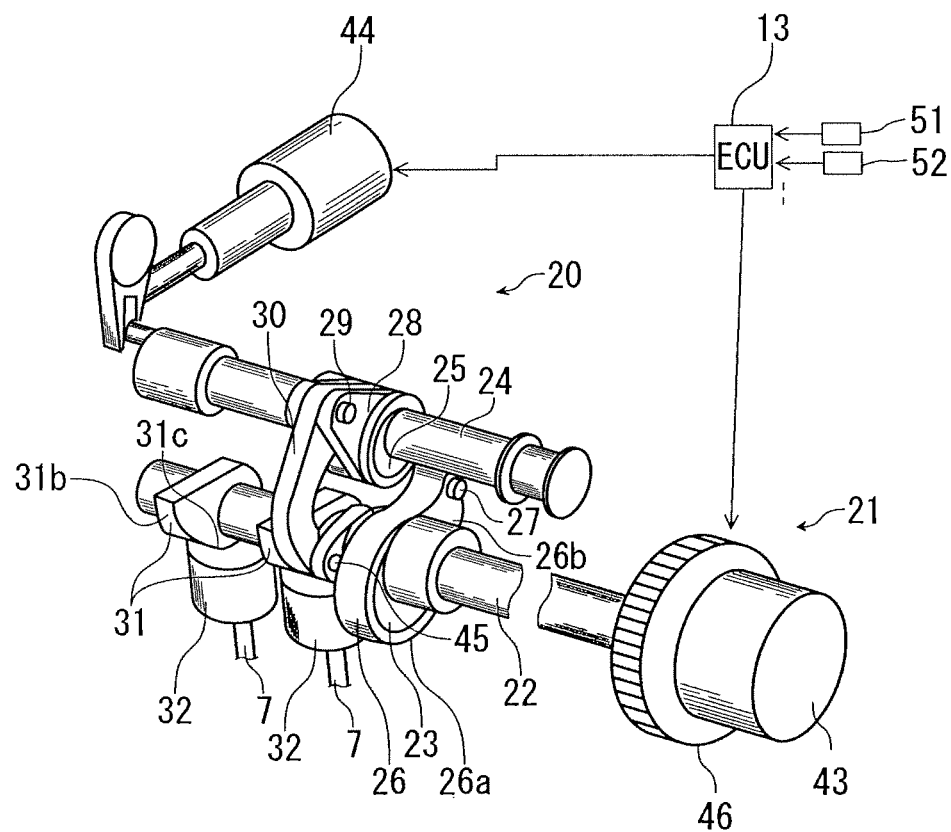
FIG. 2 is a schematic diagram of a variable valve mechanism.

In a target load calculation unit B51, a target load, which is a target value of the output of the internal combustion engine, is calculated on the basis of detection values from an accelerator opening sensor 51, a crank angle sensor 52, and so on, shown in FIG. 2, by searching a preset target load map or the like. The target load is input into a target valve timing calculation unit B52 serving as target load increase speed detecting means, a target load increase speed calculation unit B53 serving as rapid acceleration determining means, a target air amount calculation unit B54, and an operating angle upper limit limiter calculation unit B55 serving as operating angle upper limit limiting value calculating means.

In the target valve timing calculation unit B52, a target valve timing is calculated on the basis of the target load and a signal from a pre-ignition condition determination unit B60 by searching a preset target valve timing map or the like. The target valve timing is basically a valve timing for achieving the target load, and in a case where the danger of pre-ignition exists, the target valve timing is a valve timing for avoiding pre-ignition. The target valve timing calculated in this manner is input into a target operating angle calculation unit B56.

In the target load increase speed calculation unit B53, an increase speed of the target load from a previous calculation to the current calculation is calculated and input into the operating angle upper limit limiter calculation unit B55.

In the target air amount calculation unit B54, a target air amount, which is an air amount for achieving the target load, is calculated by searching a preset map or the like and input into a target throttle opening calculation unit B58.

In the operating angle upper limit limiter calculation unit B55, an operating angle upper limit limiter for limiting the operating angle is calculated on the basis of the target load and the target load increase speed using control to be described below, and then input into the target operating angle calculation unit.

In the target operating angle calculation unit B56, a target operating angle is calculated on the basis of the target valve timing and the operating angle upper limit limiter. More specifically, a value obtained by adding a limitation corresponding to the operating angle upper limit limiter to an operating angle determined from the target valve timing is set as the target operating angle. The target operating angle is input into a variable valve mechanism actuator control unit B57.

The pre-ignition condition determination unit B60, which serves as means for detecting the possibility of pre-ignition, detects a condition relating to the possibility of pre-ignition. Pre-ignition is more likely to occur when the in-cylinder temperature rises due to an increase in the cooling water temperature or the intake air temperature, and therefore the cooling water temperature and intake air temperature may be used as the condition relating to the possibility of pre-ignition. For this purpose, the cooling water temperature and the intake air temperature are detected by a cooling water temperature sensor and an intake air temperature sensor, respectively. The detected cooling water temperature and intake air temperature are input into the target valve timing calculation unit B52 and a target intake pressure upper limit limiter calculation unit B61 corresponding to throttle opening upper limit limiting value calculating means, to be described below. It should be noted that the detected condition is not limited to the cooling water temperature and the intake air temperature, and any other condition that affects the occurrence of pre-ignition may be detected instead.

In an actual operating angle detection unit B62, an actual operating angle resulting from the control performed by the variable valve mechanism actuator control unit B57 on the basis of the target operating angle is detected, whereupon the detection result is input into a cylinder effective volume calculation unit B63.

In the cylinder effective volume calculation unit B63, a cylinder effective volume is calculated on the basis of the actual operating angle.

The cylinder effective volume is derived from the fact that statically, a value obtained by subtracting a cylinder volume at top dead center TDC from a cylinder volume at the intake valve closing timing IVC corresponds to a stroke volume, but in actuality, an intake stroke start timing and an intake stroke end timing deviate from top dead center TDC and the intake valve closing timing IVC, respectively.

The reason for this is that a cylinder internal pressure reaches the intake pressure before the intake valve closing timing IVC. An amount by which the actual end timing of the intake stroke advances relative to the intake valve closing timing IVC increases, due to an increase in the effect of inertia, as the engine rotation speed increases and the valve lift amount decreases.

Hence, in the cylinder effective volume calculation unit B63, the maximum lift amount is calculated from a valve characteristic of the intake valve 7. Then, using the aforesaid advancement amount as an IVC offset, a map having the engine rotation speed and the valve lift amount as parameters is set, an IVC offset IVCOFS is determined by referring to the map, and a crank angle position obtained by subtracting the IVC offset IVCOFS from the intake valve closing timing IVC is calculated as an effective IVC at which the intake stroke ends.

Meanwhile, the intake stroke start timing deviates from intake top dead center TDC due to exhaust gas blowback caused by valve overlap.

More specifically, in a state of valve overlap, the cylinder internal pressure decreases gradually from an exhaust pressure after the intake valve 7 opens and therefore equals the intake pressure later than intake top dead center TDC. Hence, the intake stroke starts from this point. Near the start of intake valve opening, an opening area is small, and therefore the reduction in the cylinder internal pressure is also small. Therefore, this reduction essentially begins from the vicinity of an overlap central angle O/LCA at which a blowback flow rate of the exhaust gas reaches a maximum. A delay from the start of the reduction in the cylinder internal pressure to the actual intake stroke start timing (effective TDC) increases, due to an increase in the effect of inertia that causes the reduction rate of the cylinder internal pressure to slow, as the engine rotation speed increases and the valve overlap amount (overlap opening area) decreases.

Hence, in the cylinder effective volume calculation unit B63, first an intake valve opening timing IVO and the intake valve closing timing IVC are input to calculate the overlap central angle O/LCA. More specifically, on the basis of a valve characteristic IV of the intake valve 7 determined from the intake valve opening timing IVO and the intake valve closing timing IVC and a known valve characteristic EV of the exhaust valve 8, a crank angle at a point where the lift amounts of the two characteristics match (an intersection) is calculated as the overlap central angle O/LCA.

Next, an overlap opening area O/LA relative to the overlap central angle O/LCA is calculated by referring to a preset map. The overlap opening area O/LA increases as the overlap central angle O/LCA decreases (shifts to the advancement side).

Next, a map on which a delay from the overlap central angle O/LCA to effective TDC is set as a TDC offset is set using the engine rotation speed and the overlap opening area O/LA as parameters, a TDC offset TDCOFS is determined by referring to the map, and a crank angle position obtained by adding the TDC offset TDCOFS to the overlap central angle O/LCA is calculated as effective TDC.

The intake valve opening timing IVO, the intake valve closing timing IVC, and effective TDC are then input, whereupon a cylinder volume VETDC at effective TDC is calculated from the valve characteristics of the intake valve 7 by referring to a map. Likewise, IVO, IVC and the effective IVC are input, whereupon a cylinder volume VEIVC at the effective IVC is calculated by referring to a map.

The cylinder effective volume is input into the target throttle opening calculation unit B58 and the target intake pressure upper limit limiter calculation unit B61.

In the target intake pressure upper limit limiter calculation unit B61, a target intake pressure upper limit limiter for limiting an upper limit value of the target intake pressure is calculated. It should be noted that since the intake pressure varies according to the throttle opening, limiting the intake pressure means limiting the throttle opening. Accordingly, the target intake pressure upper limit limiting value corresponds to a target throttle opening upper limit limiting value. Calculations performed by the target intake pressure upper limit limiter calculation unit B61 will be described in detail below.

In the target throttle opening calculation unit B58, a target throttle opening is calculated on the basis of the target air amount, the cylinder effective volume, and the target intake pressure upper limit limiter. More specifically, a value obtained by adding a limitation corresponding to the target intake pressure upper limit limiter to the throttle opening determined on the basis of the target air amount and the cylinder effective volume is set as the target throttle opening. The target throttle opening is input into a throttle controlling actuator control unit B59.

A known method, for example a method disclosed in JP2007-278083A, published by the Japan Patent Office in 2007, may be used as the method of calculating the target throttle opening on the basis of the target air amount and the cylinder effective volume.

Next, the operating angle upper limit limiter calculation unit B55 and the target intake pressure upper limit limiter calculation unit B61 will be described.

Figure 5:
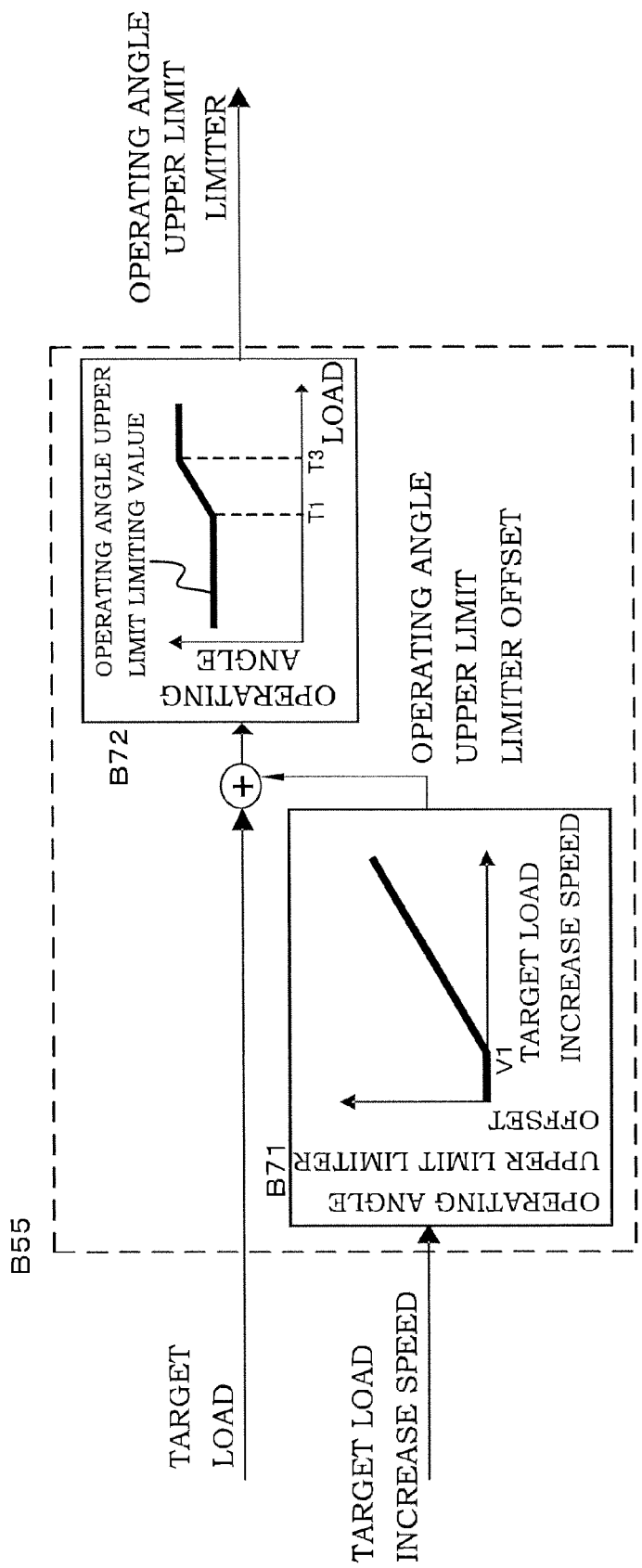
FIG. 5 is a block diagram showing control performed by an operating angle upper limit limiter calculation unit according to this invention.

FIG. 5 is a block diagram illustrating control executed by the operating angle upper limit limiter calculation unit B55. First, an operating angle upper limit limiter offset setting unit B71 calculates an operating angle upper limit limiter offset on the basis of the target load increase speed by referring to a map.

The map used here has the characteristics shown in the figure, i.e. the operating angle upper limit limiter offset is zero when the target load increase speed is equal to or lower than a predetermined value V1, and at or above the predetermined value V1, the operating angle upper limit limiter offset increases in proportion to an increase in the target increase speed.

In an operating angle upper limit limiting value setting unit B72, an operating angle upper limit limiting value is set on the basis of the operating angle upper limit limiter offset and the target load by referring to a map. The map used here has the characteristics shown in the figure. More specifically, the operating angle upper limit limiting value is constant at or below a predetermined load T1, increases in proportion to an increase in the load between the predetermined load T1 and a predetermined load T3, and becomes constant again at or above the predetermined load T3.

Figure 6:
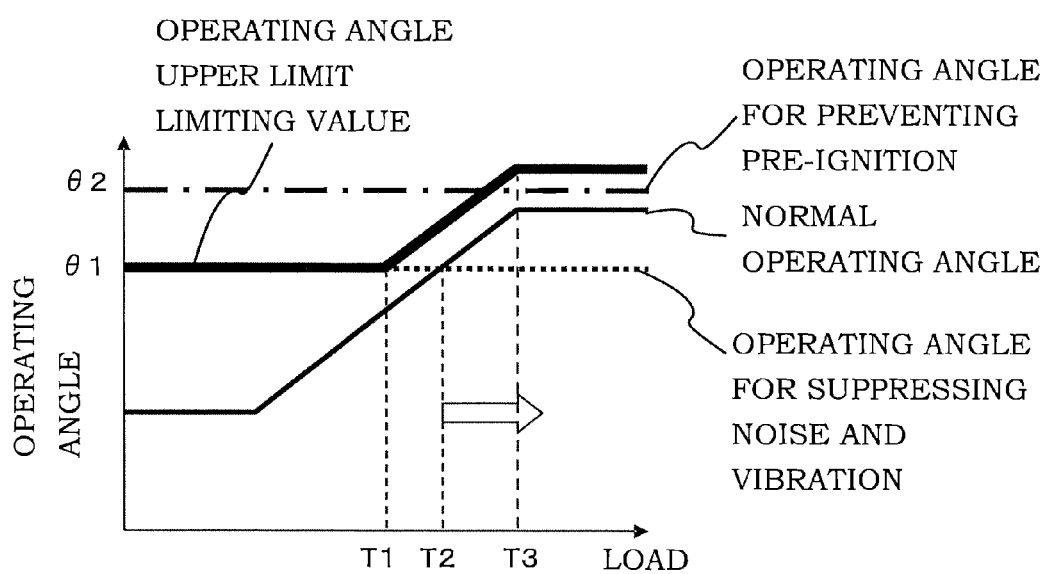
FIG. 6 is a view showing a characteristic of an operating angle upper limit limiting value according to this invention.

FIG. 6 is a view illustrating the operating angle upper limit limiting value. This figure shows characteristics of the operating angle and the operating angle upper limit limiting value relative to the load in a case where the danger of pre-ignition does not exist at a certain engine rotation speed. An operating angle θ1 in the figure is an upper limit value of the operating angle satisfying a condition for suppressing noise and vibration, while an operating angle θ2 is an operating angle for preventing pre-ignition. Further, a load that is equal to a load T2 is set as a low/medium load and a larger load than T2 is set as a high load.

As shown in the figure, at or below the load T1 in the low/medium load region, the operating angle upper limit limiting value is equal to the operating angle θ1 satisfying the condition for suppressing noise and vibration to an allowable range. In the low/medium load region, suppression of noise and vibration is required, and therefore the operating angle upper limit limiting value is set thus. In this state, however, it may be impossible to prevent pre-ignition, and therefore opening control is performed simultaneously on the throttle 15. When the opening of the throttle 15 is controlled, the output performance may deteriorate, but in the low/medium load region, the required load is low and therefore this deterioration does not pose a problem.

At or above the load T3 in the high load region, on the other hand, the operating angle upper limit limiting value is fixed at the operating angle θ2, which is larger than the operating angle for preventing pre-ignition. The reason for this is that in the high load region, the output performance is given higher priority, and since operating noise from the variable valve mechanism is less obvious due to combustion noise and intake noise, the need to suppress noise and vibration is given lower priority. In other words, pre-ignition is prevented, thereby avoiding a reduction in output performance, simply by modifying the operating angle, i.e. without performing throttle opening control. The operating angle θ2 may be set at the operating angle for preventing pre-ignition, but to ensure that pre-ignition is prevented reliably, the operating angle θ2 is set at a value exceeding the operating angle for preventing pre-ignition.

Hence, the controller 13 avoids pre-ignition by prioritizing the need to suppress noise and vibration within the allowable range over the output performance in the low/medium load region and controlling the throttle opening simultaneously. In the high load region, on the other hand, the controller 13 prioritizes the output performance over noise and vibration suppression and therefore prevents pre-ignition simply by modifying the operating angle.

In a region extending from the load T1 to the load T3, which sandwiches a boundary (the load T2) between the low/medium load region and the high load region, the operating angle of the intake valve 7 is increased from the upper limit operating angle θ1 for satisfying the need to suppress noise and vibration to the operating angle θ2 for preventing pre-ignition in proportion to an increase in the load of the engine. When the operating angle limit upper limit value is switched by a predetermined load in steps, the throttle opening also varies in steps, leading to torque shock. However, this type of torque shock is prevented by increasing the operating angle in accordance with the load from the load T1 to the load T3.

When the operating angle upper limit limiting value is set in this manner, the operating angle is enlarged only to θ1 in a case where the danger of pre-ignition exists at or below the load T1. Pre-ignition cannot be prevented at this operating angle, and therefore pre-ignition is prevented by controlling the opening of the throttle 15 to reduce the intake air amount.

When the danger of pre-ignition exists at or above the load T3, on the other hand, pre-ignition can be prevented simply by enlarging the operating angle, and therefore pre-ignition can be prevented while avoiding a reduction in output.

Figure 7:
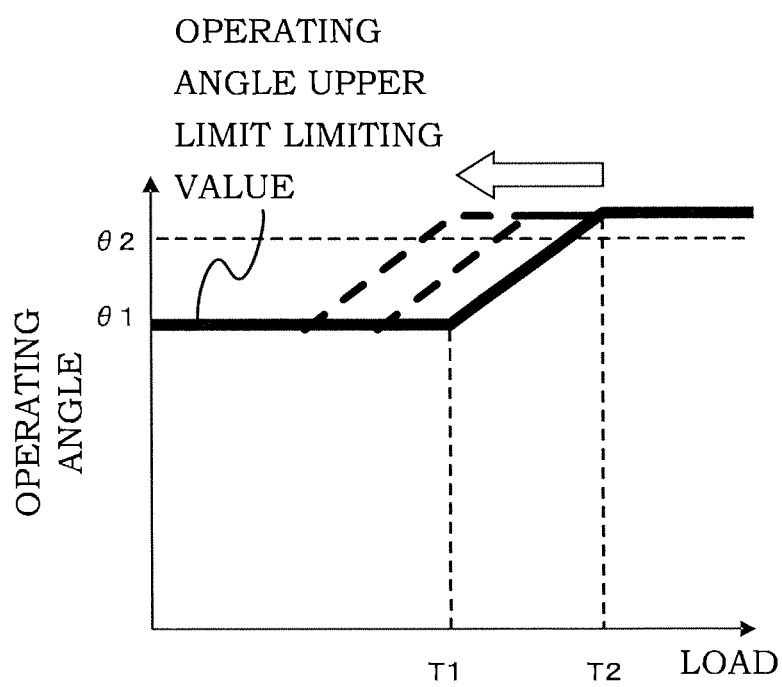
FIG. 7 is a view showing a characteristic of an operating angle upper limit limiter offset according to this invention.

The operating angle upper limit limiter offset is an amount by which a change-over position of the operating angle upper limit value limiting value is shifted to the low load side. The operating angle upper limit limiting value increases as the target load increase speed increases, and therefore, as shown in FIG. 7, the operating angle upper limit value increases from a steadily lower load as the target load increase speed increases. With this characteristic, the operating angle upper limit limiting value increases from a lower load, and therefore a reduction in output during a transition can be suppressed even if a response delay or the like occurs in an actuator for driving the variable valve mechanism 9.

Further, in a vehicle having an automatic transmission capable of switching between a normal travel mode and a sport travel mode in which shifts are performed at higher engine rotation speeds than in the normal travel mode, for example, the operating angle upper limit limiting value may be offset in a state where an increase in the frequency of rapid acceleration is predicted, for example when the sport travel mode is selected. In so doing, favorable drivability can be maintained while avoiding instability due to an increase in control switching frequency. In this case, the controller 13 detects the travel mode from a signal output by a transmission controller and therefore serves as a sensor for predicting the rapid acceleration frequency.

It should be noted that the region between the loads T1 and T3 in which the operating angle upper limit limiting value increases in proportion to the load may be eliminated such that at or below the load T2, the operating angle upper limit limiting value is set at the operating angle θ1 and at a higher load than the load T2, the operating angle upper limit limiting value is set at the operating angle θ2. In this case, the load at which the operating angle upper limit limiting value is switched varies according to the operating angle upper limit limiter offset. By employing this simple constitution, it is possible to reduce a calculation load and simplify adaptation to engine specifications.

Further, the operating angle upper limit limiting value may be increased in proportion to the load from a low load to a high load. Likewise in this case, the load at which the operating angle upper limit limiting value is switched varies according to the operating angle upper limit limiter offset.

Figure 8:
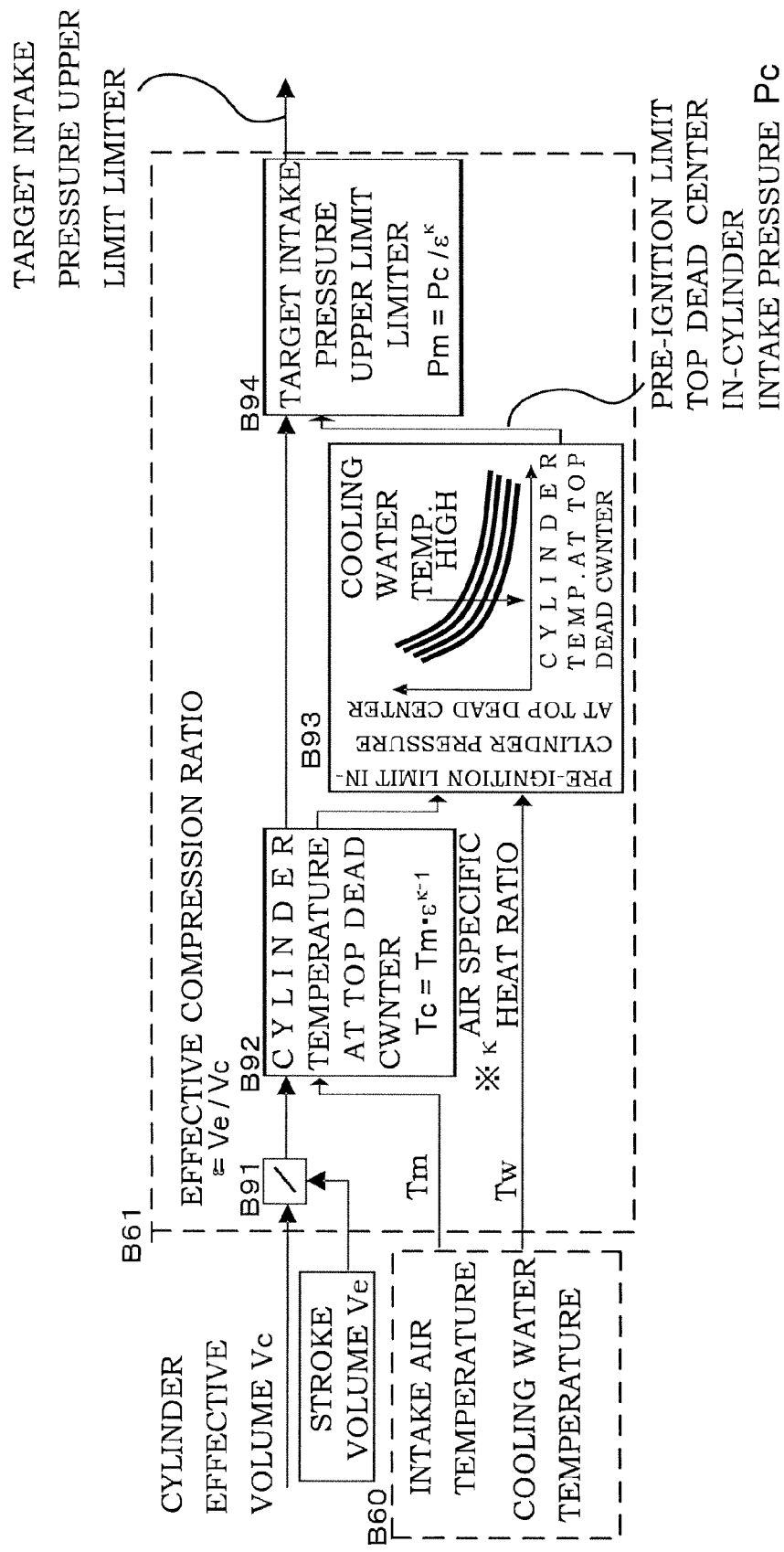
FIG. 8 is a block diagram showing the constitution of a target intake pressure limiter calculation unit according to this invention.

FIG. 8 is a view showing the target intake pressure limiter calculation unit B61 of FIG. 4 in detail.

In an effective compression ratio calculation unit B91, an effective compression ratio ε (=Ve/Vc) is calculated from a cylinder effective volume Vc and a stroke volume Ve determined from a piston stroke and a cylinder bore.

In an in-cylinder top dead center temperature calculation unit B92, an in-cylinder top dead center temperature Tc, i.e. the internal temperature of the cylinder at top dead center, is calculated from the effective compression ratio ε and an intake air temperature Tm using Equation (1).

$$Tc = Tm \times \epsilon^{\kappa-1} \quad (1)$$

κ: air specific heat ratio

In a pre-ignition limit top dead center in-cylinder intake pressure calculation unit B93, a pre-ignition limit top dead center in-cylinder intake pressure Pc, which is an upper limit top dead center intake pressure at which pre-ignition does not occur, is calculated from the in-cylinder top dead center temperature Tc and a cooling water temperature Tw by referring to a map.

The map used here defines a relationship between the pre-ignition limit top dead center in-cylinder intake pressure Pc at each cooling water temperature and the in-cylinder top dead center temperature Tc, wherein the pre-ignition limit top dead center in-cylinder intake pressure Pc is set on the ordinate and the in-cylinder top dead center temperature Tc is set on the abscissa. The pre-ignition limit top dead center in-cylinder intake pressure Pc increases as the in-cylinder top dead center temperature Te decreases and decreases as the cooling water temperature increases. In other words, the map has a characteristic whereby at a constant in-cylinder top dead center temperature Tc, pre-ignition occurs from a steadily lower intake pressure as the cooling water temperature Tw increases, and at a constant cooling water temperature Tw, pre-ignition occurs from a steadily lower intake pressure as the in-cylinder top dead center temperature Tc increases.

In a target intake pressure upper limit limiter calculation unit B94, a target intake pressure upper limit limiter, which is an upper limit value of a pressure (intake pressure) in an intake pipe at which an in-cylinder pressure at top dead center is suppressed to or below the pre-ignition limit top dead center in-cylinder intake pressure Pc, is calculated.

More specifically, a target intake pressure upper limit limiter Pm serving as an upper limit side limit value of the target intake pressure is calculated from the effective compression ratio $\epsilon$ used by the in-cylinder top dead center temperature calculation unit B92 and the pre-ignition limit top dead center in-cylinder intake pressure Pc using Equation (2).

$$Pm = Pc/\epsilon^\kappa \qquad (2)$$

It should be noted that Equation (2) is an operational expression assuming that adiabatic compression is performed in a compression stroke. However, an expression that takes cooling loss and so on into account may be used instead.

As described above, the target intake pressure upper limit limiter Pm calculated in this manner is input into the target throttle opening calculation unit B58 of FIG. 4 together with the target air amount and the cylinder effective volume Vc.

According to Equation (2), the target intake pressure upper limit limiter Pm increases as the pre-ignition limit top dead center in-cylinder intake pressure Pc increases and the effective compression ratio $\epsilon$ decreases. Meanwhile, the cylinder effective volume Vc increases, leading to a reduction in the effective compression ratio $\epsilon$, as the operating angle increases, and the in-cylinder top dead center temperature Tc decreases as the effective compression ratios decreases, leading to an increase in the pre-ignition limit top dead center in-cylinder intake pressure Pc.

Hence, the target intake pressure upper limit limiter Pm, or in other words the upper limit limiting value of the throttle opening, increases as the operating angle increases.

It should be noted that this invention is not limited to the embodiment described above and may be subjected to various modifications within the scope of the technical spirit described in the claims.

With regard to the above description, the contents of JP2008-170112A, with a filing date of Jun. 30, 2008 in Japan, are incorporated herein by reference.

INDUSTRIAL APPLICABILITY

As described above, this invention is capable of suppressing a reduction in a noise/vibration performance by setting an operating angle upper limit limiting value for limiting an upper limit value of an intake valve operating angle in accordance with a noise/vibration requirement determined from operating conditions. Further, a throttle opening upper limit limiting value is set in accordance with the operating angle, and therefore, in a case where pre-ignition cannot be avoided simply by modifying a valve timing through limitation of the operating angle, pre-ignition can be avoided through throttle control.

Exclusive features or advantages encompassed by the embodiments of this invention are as claimed below.

The invention claimed is:

1. A control device for an internal combustion engine comprising:
   an intake valve;
   a variable valve mechanism configured to control a closing timing and an operating angle of the intake valve continuously and variably;
   a first sensor;
   a throttle for controlling an intake air amount, and
   a programmable controller configured to:
     determine when there is a possibility of pre-ignition based on a value from the first sensor;
     retard the closing timing of the intake valve from bottom dead center by increasing the operating angle of the intake valve when the possibility of pre-ignition is determined;
     calculate an operating angle upper limit limiting value for limiting an upper limit value of the operating angle of the intake valve in accordance with a noise/vibration suppression requirement determined from an operating condition of the engine; and
     calculate a throttle opening upper limit limiting value for limiting an upper limit value of a throttle opening based on the operating angle of the intake valve.

2. The control device for an internal combustion engine as defined in claim 1, wherein the controller is further configured to:
   calculate the operating angle upper limit limiting value based on an engine load.

3. The control device for an internal combustion engine as defined in claim 1, wherein the controller is further configured to:
   increase an operating angle upper limit limiting value in a high load region beyond a predetermined load relative to an operating angle upper limit limiting value in a low load region below a predetermined load.

4. The control device for an internal combustion engine as defined in claim 3, wherein the controller is further configured to:
   avoid pre-ignition in the low load region below the predetermined load by controlling opening of the throttle in a state where the operating angle is set at the operating angle upper limit limiting value, and
   avoid pre-ignition in the high load region beyond the predetermined load simply by modifying the operating angle.

5. The control device for an internal combustion engine as defined in claim 2, further comprising:
   a second sensor configured to detect a speed at which a target load increases,
   wherein the controller is further configured to set the operating angle upper limit limiting value at a steadily larger value as the speed at which the target load increases is increasing at a constant load.

6. The control device for an internal combustion engine as defined in claim 2,
   wherein the operating angle upper limit limiting value takes a fixed value that is relatively larger than a predetermined change-over load on a high load side and a fixed value that is relatively smaller than a predetermined change-over load on a low load side.

7. The control device for an internal combustion engine as defined in claim 6, wherein the controller is further configured to:
   set the operating angle upper limit limiting value such that, within a predetermined range extending from a load that is lower than the change-over load by a predetermined amount to a load that is higher than the change-over load by a predetermined amount, the operating angle upper limit limiting value increases in accordance with an increase in the load from an operating angle upper limit limiting value on the low load side of the change-over load to an operating angle upper limit limiting value on the high load side of the change-over load.

8. The control device for an internal combustion engine as defined in claim 6,
wherein the operating angle upper limit limiting value on the low load side is an upper limit value of the operating angle for satisfying the noise/vibration suppression requirement, and
wherein the operating angle upper limit limiting value on the high load side is a value equal to or greater than an upper limit value of an operating angle at which pre-ignition is avoidable.

9. The control device for an internal combustion engine as defined in claim 6, further comprising:
a second sensor configured to detect a rapid acceleration state,
wherein the controller is further configured to
determine whether the rapid acceleration state is established based on a value from the second sensor, and
reduce the change-over load upon determining that the rapid acceleration state is established.

10. The control device for an internal combustion engine as defined in claim 6, further comprising:
a second sensor configured to detect a rapid acceleration frequency,
wherein the controller is further configured to
predict an increase in the rapid acceleration frequency based on a value from the second sensor, and
reduce the change-over load in advance upon predicting the increase in the rapid acceleration frequency.

11. The control device for an internal combustion engine as defined in claim 3, further comprising:
a second sensor configured to detect a speed at which a target load increases,
wherein the controller is further configured to set the operating angle upper limit limiting value at a steadily larger value as the speed at which the target load increases is increasing at a constant load.

12. The control device for an internal combustion engine as defined in claim 3,
wherein the operating angle upper limit limiting value takes a fixed value that is relatively larger than a predetermined change-over load on a high load side and a fixed value that is relatively smaller than the predetermined change-over load on a low load side.

13. The control device for an internal combustion engine as defined in claim 12, wherein the controller is further configured to:
set the operating angle upper limit limiting value such that within a predetermined range extending from a load that is lower than the change-over load by a predetermined amount to a load that is higher than the change-over load by a predetermined amount, the operating angle upper limit limiting value increases in accordance with an increase in the load from an operating angle upper limit limiting value on the low load side of the change-over load to an operating angle upper limit limiting value on the high load side of the change-over load.

14. The control device for an internal combustion engine as defined in claim 12,
wherein the operating angle upper limit limiting value on the low load side is an upper limit value of the operating angle for satisfying the noise/vibration suppression requirement, and
wherein the operating angle upper limit limiting value on the high load side is a value equal to or greater than an upper limit value of an operating angle at which pre-ignition is avoidable.

15. The control device for an internal combustion engine as defined in claim 12, further comprising:
a second sensor configured to detect a rapid acceleration state,
wherein the controller is further configured to
determine whether the rapid acceleration state is established based on a value from the second sensor, and
reduce the change-over load upon determining that the rapid acceleration state is established.

16. The control device for an internal combustion engine as defined in claim 12, further comprising:
a second sensor configured to detect a rapid acceleration frequency,
wherein the controller is further configured to
predict an increase in the rapid acceleration frequency, and
reduce the change-over load in advance upon predicting the increase in the rapid acceleration frequency.

17. A control method for an internal combustion engine, the internal combustion engine comprising:
an intake valve;
a variable valve mechanism configured to control a closing timing and an operating angle of an intake valve continuously and variably;
a sensor; and
a throttle for controlling an intake air amount, and
a programmable controller,
the control method comprising:
determining, by the controller, when there is a possibility of pre-ignition based on a value from the sensor,
retarding the closing timing of the intake valve when the controller determines the possibility of pre-ignition,
calculating an operating angle upper limit limiting value for limiting an upper limit value of the operating angle of the intake valve in accordance with a noise/vibration requirement determined from an operating condition of the engine; and
calculating a throttle opening upper limit limiting value for limiting an upper limit value of a throttle opening based on the operating angle of the intake valve.

* * * * *